(12) United States Patent
Addeo et al.

(10) Patent No.: US 6,190,755 B1
(45) Date of Patent: Feb. 20, 2001

(54) INJECTION-MOLDED REFRIGERATOR LINERS

(75) Inventors: Antonio Addeo, Milan; Dino Bacci, Pordenone; Alberto Bonvini, Gorgonzola, all of (IT)

(73) Assignee: Montell Technology Company bv (NL)

( * ) Notice: Under 35 U.S.C. 154(b), the term of this patent shall be extended for 0 days.

(21) Appl. No.: 09/172,971

(22) Filed: Oct. 14, 1998

Related U.S. Application Data

(63) Continuation of application No. PCT/EP98/00858, filed on Feb. 16, 1998.

(30) Foreign Application Priority Data

Feb. 17, 1997 (EP) .................................................. 97200461

(51) Int. Cl.⁷ .................................................. B32B 3/00
(52) U.S. Cl. ........................... 428/156; 428/120; 428/167
(58) Field of Search .................................... 428/167, 172, 428/71, 318.8, 156, 141, 120

(56) References Cited

U.S. PATENT DOCUMENTS

| | | | |
|---|---|---|---|
| 3,970,324 | * | 7/1976 | Howat .................................. 428/71 |
| 4,136,220 | * | 1/1979 | Olabisi ................................ 428/71 |
| 4,156,045 | * | 5/1979 | Burger ................................. 428/71 |

FOREIGN PATENT DOCUMENTS

| | | |
|---|---|---|
| 1609424 | 4/1970 | (DE) . |
| 2510930 | 9/1976 | (DE) . |
| 2143465 | 7/1984 | (GB) . |
| 2171189 | 2/1986 | (GB) . |

OTHER PUBLICATIONS

European Patent Office, Patent Abstract of Japan, Abstract of Japanese Patent Application Publication No. JP58081134 (1983).

Derwent English Language Abstract of DE 2510930.

* cited by examiner

*Primary Examiner*—Donald Loney
(74) *Attorney, Agent, or Firm*—Bryan Cave LLP

(57) ABSTRACT

Injection-moulded refrigerator liners of a thermoplastic polymer characterized by the presence of means for mechanical bonding on the insulating foam.

7 Claims, 2 Drawing Sheets

INJECTION-MOLDED REFRIGERATOR LINERS

This application is a continuation of PCT/EP98/00858, filed Feb. 16, 1998.

The present invention concerns injection moulded refrigerator liners characterized by the possibility of mechanical bonding of the insulating foam. In particular the invention concerns refrigerator inner liners having appropriately shaped and distributed protruding parts, obtained by injection moulding of a thermoplastic polymer, in particular a propylene polymer, in order to make possible the subsequent coupling of the insulating foam to the back surface of the liner without the use of any particular pretreatment of said surface.

The present technology for the production of the refrigerator inner liners is essentially based on thermoforming a thermoplastic sheet, primarily of polystyrene. Such a technology, however, presents quite a few drawbacks, e.g. low productivity in the sheet extrusion process, difficulties in the dimensional control of the sheets, difficulties or even impossibility to integrate the creation of complex constructive features, like tubing for air streaming in the "no frost" refrigeration system, in the main production process.

Moreover, the thermoforming technology can hardly be used with a propylene polymer, which should actually be preferred on the basis of just the physical-mechanical properties of the polymer, owing to a few additional difficulties, like low melt strength, excessive sag of the polymer, narrow working temperature range. Furthermore a polypropylene refrigerator liner prepared with the thermoforming technology would require some special treatment in order to modify its surface and make possible the necessary bonding with a polyurethane foam.

We have found that all these drawbacks can be overcome by shifting from the thermoforming technology to the injection moulding technology, introducing some innovative features in the shape of the liner, such features being easily obtainable by way of the injection moulding technology using opportunely shaped moulds, in order to make possible a mechanical bonding between the liner itself and the insulating foam. The invention can be applied to any thermoplastic polymer, but it is particularly suitable for polyolefins and further in particular for propylene polymers.

The refrigerator liners of the invention have some protruding means on the back surface of the liner, i.e. on the surface which is left inside the refrigerator body, in order to achieve a suitable peeling strength, preferably higher than 100 KPa, of the bonding with the insulating foam. The foam is prepared in situ, by delivering the polymer to be foamed in the molten or softened state and in admixture with the expansion gas, which causes the foaming of the polymer, directly on the back surface of the liner. Examples of expansion gas are nitrogen, carbon dioxide, volatile hydrocarbons like butane, isobutane and pentane. Typical examples of foamable polymers comprise polyurethane, polypropylene, polyethylene, polystyrene, polyvinylchloride. In the case of polyurethane the foams can be also prepared by the controlled entrapment of an expansion gas during the polymerization that forms urethane linkages between polyfunctional alcohols and polyisocyanates. In this case the foams are produced from liquid reactants that are mixed in carefully controlled formulations and discharged in contact with the back surface of the liner from mixing heads.

Figure 1:
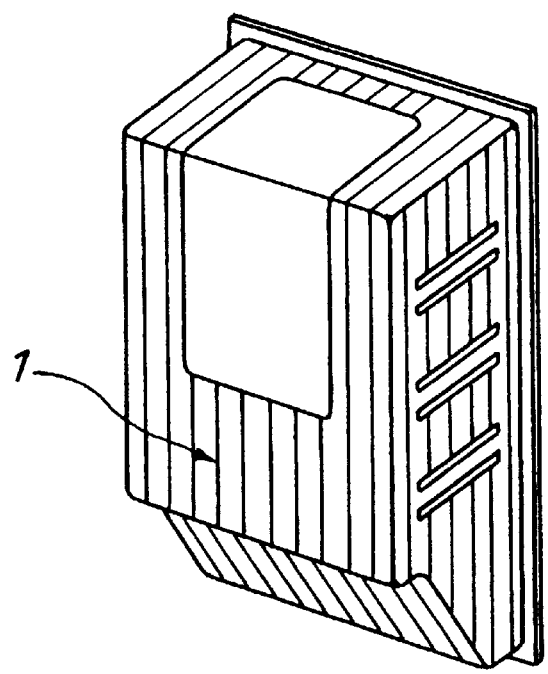
FIG. 1 shows a refrigerator inner liner with a series of vertical embosssed stripes on the back surface.
Figure 2:
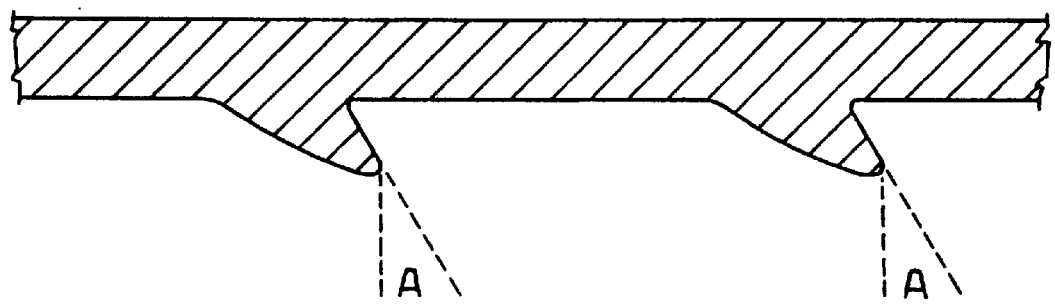
FIG. 2 shows a horizontal cross-section view of the series of vertical embossed stripes on the back surface of a refrigerator inner liner.
Figure 3:
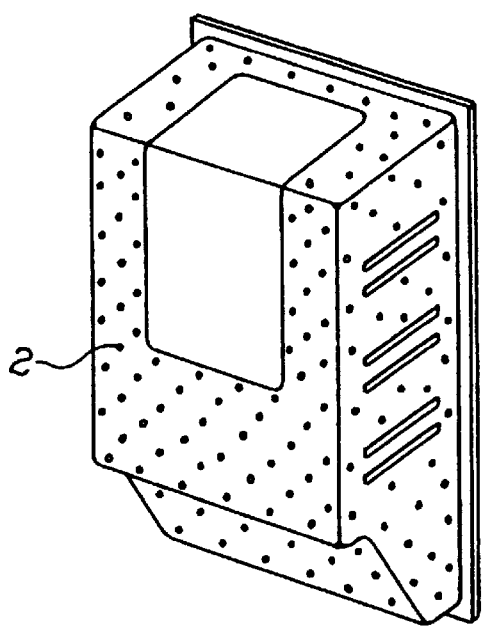
FIG. 3 shows a refrigerator inner line with punctiform bonding means.
Figure 4:
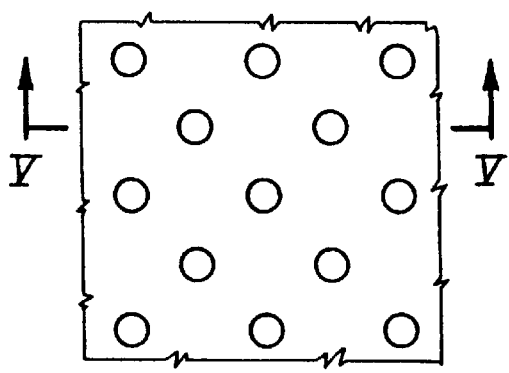
FIG. 4 shows a homogeneous staggered rhomboidal disposition of the punctiform means of the refrigerator inner liner.
Figure 5:
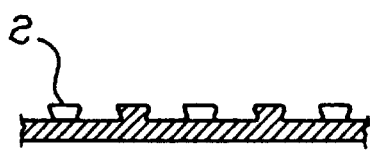
FIG. 5 shows a horizontal cross-section view of the homogeneous staggered rhomboidal disposition of the punctiform means.
Figure 6:
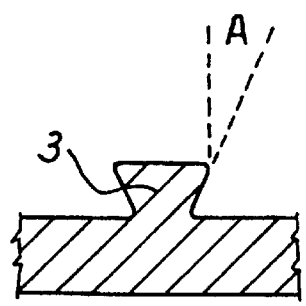
FIG. 6 shows an enlarged horizontal cross-section view of the fungiform heads of the punctiform means of the refrigerator inner liner.

Geometrical characteristics of the refrigerator inner liners according to the present invention will become evident from the following disclosure in detail, supplied for merely exemplifying, non-limitative purposes, by referring to the accompanying drawings. FIG. 1 shows a refrigerator inner liner with a series of vertical embossed stripes 1 on the back surface. FIG. 2 shows an horizontal cross-section view of the stripes and presents in detail the "delivery angle" A from the mould. For delivery angle it is meant the acute angle between the protruding mean and the normal to the back surface of the liner, this angle determining the possibility of extracting the liner from the mould used for its preparation. The existence of this feature significantly improves the strength of the bonding of the insulating foam to the thermoplastic polymer back surface. Preferably the embossed stripes have embossing height 0.5–2 mm, delivery angle 5–15° and stripe spacing 20 to 50 mm. Preferably the refrigerator inner liner of the invention have punctiform bonding means, as shown in FIG. 3. The disposition of the means is important in order to determine the strength of the bonding. Experimentally it has been found that a homogeneous staggered rhomboidal disposition of the punctiform means, as shown in detail in the front view of FIG. 4 and in the section view of FIG. 5, is quite effective. Shape, size and amount of the bonding means are also very important. One of the best solutions is given by the fungiform heads 3 shown in section view in FIG. 6, either solid or with a conic cavity open upwards to make easier the detachment of the liner from the mould. The most effective values of the parameters characterizing the fungiform heads are: diameter 5–7 mm, height 1–2.2 mm, angle A of delivery from the mould 5–15° and distance of the heads one from the other in orthogonal lines from 100 to 300 mm. Several other types of bonding means can be envisaged and effectively used and are to be considered within the scope of the invention.

As said before, any thermoplastic polymer can be used in the formation of the refrigeration inner liners of the invention, e.g. ethylene polymers and copolymers, propylene polymers and copolymers, styrene polymers and copolymers including ABS, polyvinylchloride. Preferred thermoplastic polymers, however, are propylene polymers and copolymers and in particular propylene polymers having Melt Index L (ASTM D 1238) higher than 10 g/10 minutes and Flexural Modulus at 23° C. (ASTM D 790) higher than 200 MPa and copolymers of propylene with ethylene and/or $C_4$–$C_8$ α-olefins having Melt Index L higher than 10 g/10 minutes and Flexural Modulus higher than 170 MPa. As to the insulating foam used with the liners of the invention, any polymer foam can be used. Preferred insulating foams, however, are the polyurethane foams.

The refrigerator inner liners of the invention can advantageously include additional features which can be easily obtained by the injection moulding process. A typical example is given by the inclusion of ducts in the walls or in the rims of the liners, either as a structural element or, more frequently, for the passage of the cold air in the "no-frost" refrigeration system. Typically such ducts can be obtained with the so-called "air mould" technology.

Another feature which can be added to the refrigerator liners of the invention is the modularity. As a matter of fact with the injection moulding process modular liners having different features, in particular different capacity, can be prepared easily. Modular home refrigerators obtained by assembling two or more liners according to the invention, either same or more frequently different, are therefore included in the claims of the instant invention. Obviously the liners composing the refrigerator must be bonded one to the other before preparing the insulating foam. Several different means for the bonding of the liners can be envisaged and prepared in the injection moulding process.

Experimental Work

1) Using a polypropylene refrigerator inner liner of the type shown in FIG. 1, with the possibility of mechanical bonding of the insulating foam to the thermoplastic polymer surface due to embossed stripes 1, the resistance to the detachment of a polyurethane foam from the liner surface is measured experimentally. When the embossed stripes have embossing height 0.5–2 mm, delivery angle (A) 5–15° and stripe spacing 20 to 50 mm, a peeling strength in the range 80–90 KPa is obtained.

For comparison purpose, the peeling strength values of the polyurethane foam from a smooth metal surface and from a smooth polypropylene surface are in the range 170–220 KPa and in the range 20–40 KPa respectively. Said values for the smooth polypropylene surface are insufficient for practical applications.

2) Using a polypropylene refrigerator inner liner of the type shown in FIG. 2 with mechanical bonding of the insulating foam to the thermoplastic polymer surface due to embossed fungiform heads 3 in staggered rhomboidal disposition, the resistance to the detachment of a polyurethane foam from the liner surface is measured experimentally. When the embossed fungiform heads have diameter 5–7 mm, height 1–2.2 mm, delivery angle 5–15° and spacing of the heads in orthogonal lines 100 to 300 mm, a peeling strength in the range 140–160 KPa is obtained.

What is claimed is:

1. An Injection-moulded molded refrigerator liner comprising a thermoplastic olefin polymer wherein the back surface of the liner is provided with a means for mechanical bonding of the liner to an insulating foam, said means being selected from embossed stripes and punctiform means, and said means being arranged to lead to a peeling strength of at least 80 KPa when the insulating foam is polyurethane.

2. A liner according to claim 1 consisting essentially of polypropylene.

3. A liner according to claim 1 wherein the means for bonding the liner to an insulating foam comprises embossed stripes of height 0.5–2 mm, delivery angle (A) 5–15° and stripe spacing 20 to 50 mm.

4. A liner according to claim 1 wherein the means for bonding the liner to an insulating foam are punctiform means and are homogeneously distributed on the back surface of the liner with a staggered rhomboidal disposition.

5. A liner according to claim 4 wherein the punctiform means consist of fungiform heads having diameter from 5 to 7 mm, height from 1 to 2.2 mm and delivery angle (A) from 5 to 15°.

6. Refrigerator liners according to claim 5 wherein the distance of the fungiform heads in orthogonal lines is comprised between 100 and 300 mm.

7. Refrigerator liners according to claim 5 wherein the fungiform heads have a conic cavity open upwards.

* * * * *